United States Patent [19]
Fulkerson et al.

[11] 3,840,261
[45] Oct. 8, 1974

[54] SCOOP AND SHEATH MEANS THEREFOR
[76] Inventors: Homer L. Fulkerson, 749 Fairway, Wichita, Kans. 67212; Wayne S. Anderson, 211 N. Spruce, Wichita, Kans. 67214
[22] Filed: May 17, 1972
[21] Appl. No.: 253,967

[52] U.S. Cl.................... 294/55, 248/224, 248/311
[51] Int. Cl. ........................................... A47f 13/08
[58] Field of Search ........... D44/29 J, 24 R; 294/55; 141/108; 62/344; 220/18, 23.4; 248/311, 224; 211/88, 60 T; D7/104

[56] References Cited
UNITED STATES PATENTS

| 264,072 | 9/1882 | French.................................. 294/55 |
| 422,410 | 3/1890 | Hickok ............................... 248/224 |
| 1,787,734 | 1/1931 | Rowling............................. 248/224 |
| 1,876,284 | 9/1932 | Fried.................................. 211/60 T |
| 2,102,083 | 12/1937 | MacDonald ....................... 248/311 |
| 3,371,694 | 3/1968 | Miller .................................. 294/55 |

FOREIGN PATENTS OR APPLICATIONS
501,202  7/1930  Germany .............................. 294/55

Primary Examiner—Evon C. Blunk
Assistant Examiner—James L. Rowland
Attorney, Agent, or Firm—John H. Widdowson

[57] ABSTRACT

A scoop and sheath means therefor for handling particulate material. The sheath has a plurality of sidewalls and an end member forming a cavity to receive the scoop. The sheath preferably has means to secure it to a supporting structure. The scoop has a bottom portion, side portions extending upward from the bottom portion, an upright portion secured to the bottom and side portions, forming a material carrying compartment and another compartment, and a handle extending from the upright portion in the latter compartment. In use material is handled without coming in contact with the hand of the user.

5 Claims, 9 Drawing Figures

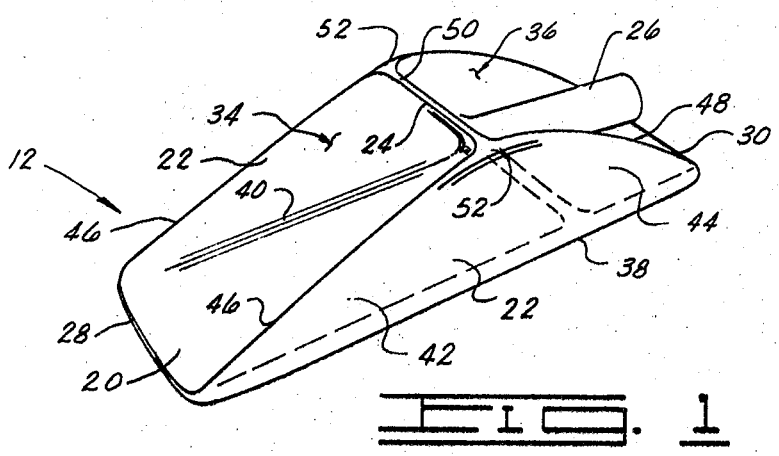
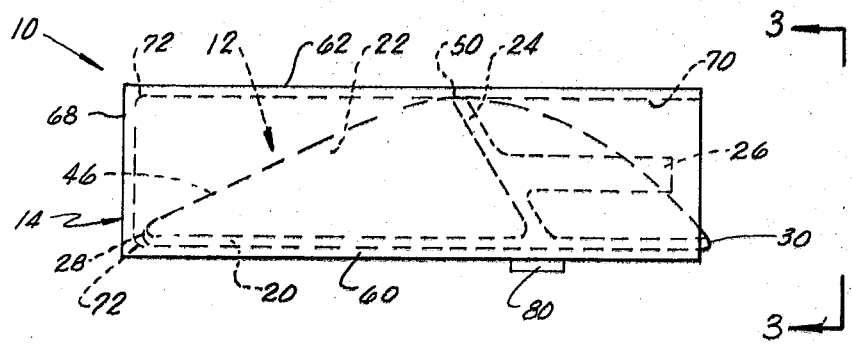
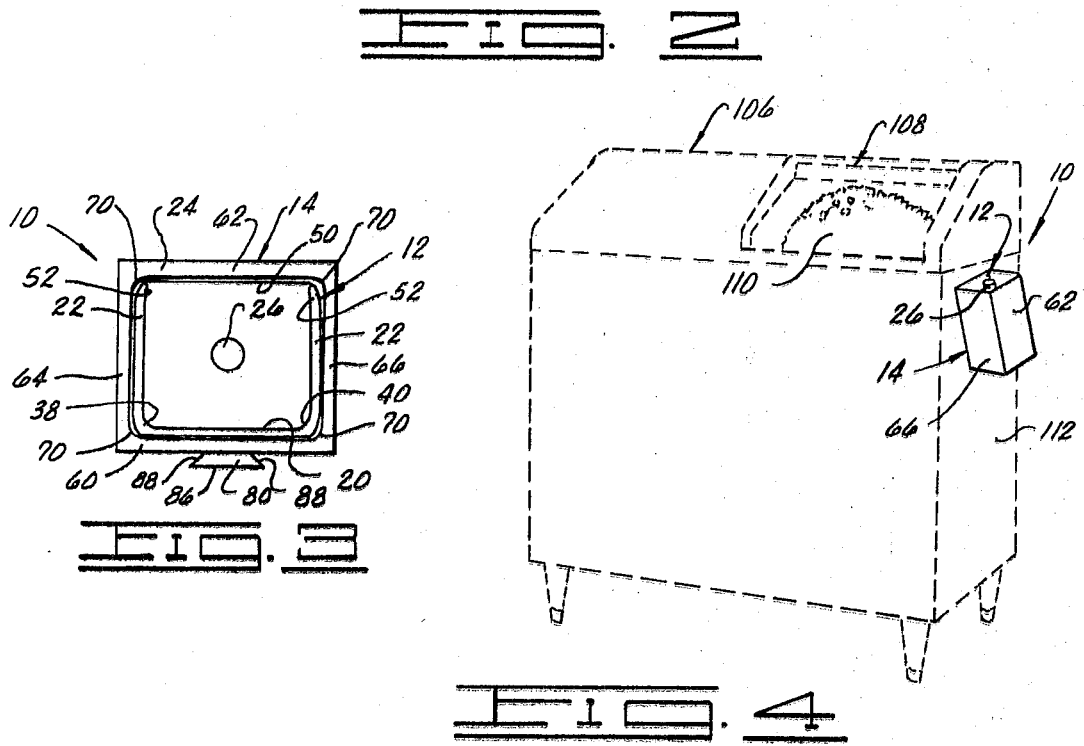

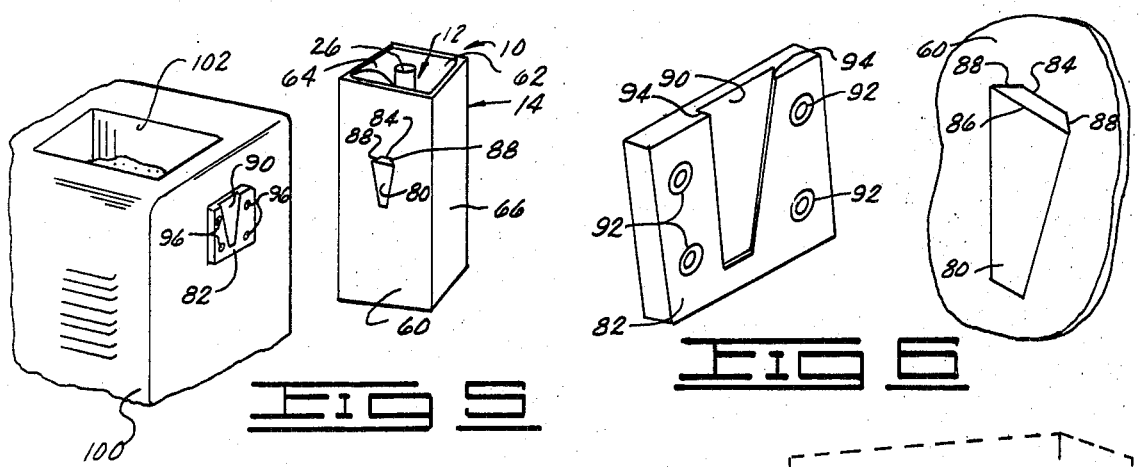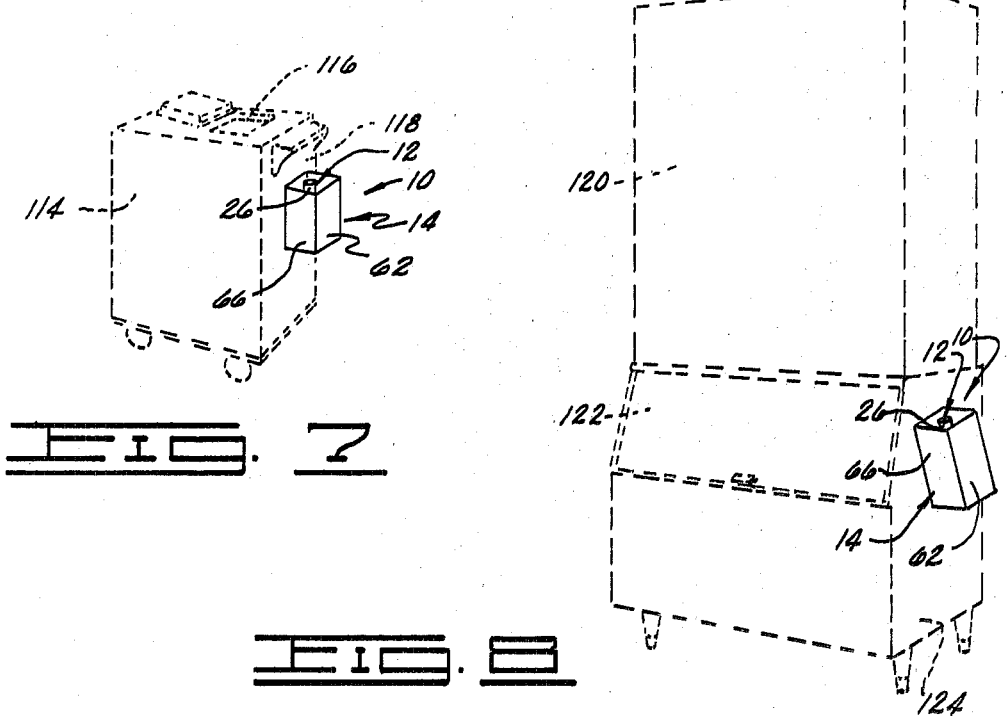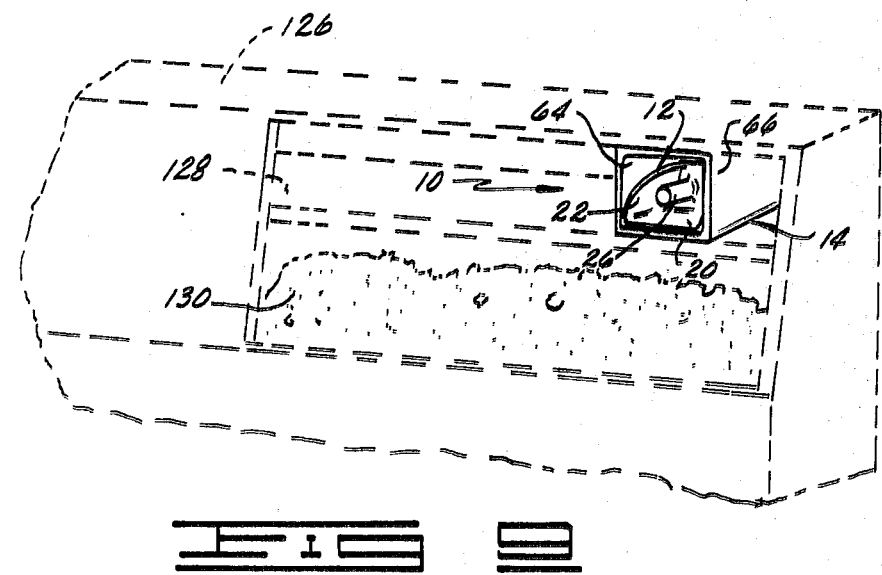

SCOOP AND SHEATH MEANS THEREFOR

Numerous scoops and scoop type devices are known in the prior art as adapted for handling particulate materials which have a material carrying compartment structurally formed in the device with an opening on one end thereof and a handle by which to pick up the device. Some of the prior art devices are formed much like a multi-sided container having one side thereof removed to expose the cavity and having the handle on the top, back, or side of the scoop. Other prior art devices are scoops having an open cavity bounded by various structural shapes and having basically a bottom with upturned sides and a back and having the handle on the back portion. The open cavity scoops generally are comprised of the open cavity structural portion with a handle extending therefrom. In the prior art no devices are specifically known as cases or containers or anything of the like constructed specifically to store a scoop when not in use and to prevent its contact or contamination. In the prior art of scoops, no scoop is known to have a handle on the back portion thereof which is shielded or constructed and adapted to prevent possible contact of a person's hand with material which he is scooping; only the devices which have the handle on the top or side thereof can in any way effectively prevent the possible contact of a person's hand with the material which he is scooping. The prior art scoop devices have several disadvantages, one of which is the possibility of contact with the material being scooped by a person who is handling the scoop. Contact of material being scooped is a possibility in all the devices having a handle on the back, side, or top portion thereof which is substantially exposed. An additional disadvantage of the prior art devices is that most of the prior art scoop devices have sharp edge contours which tend to engage and retain material which can cause an inadvertent mixing of materials and/or contamination of materials being scooped.

In one preferred specific embodiment of this invention, the scoop and sheath means structure includes a sheath mountable on a supporting structure and adapted to hold for storage a scoop, with the scoop having a material carrying compartment, and a shielded handle portion. The scoop structure of this invention is of the type having the handle on the rear or back portion thereof with an open cavity or material carrying compartment directly ahead of the handle. Specifically, the scoop structure of the herein described invention has an elongated bottom portion with sidewalls extending upward on the outer elongated edges thereof, an upright member in the center portion thereof forming the back of the open cavity or material carrying compartment, a handle extending from the upright portion in a direction opposite of the material carrying compartment and between the sidewalls and in the other compartment portion. The scoop structure of this invention has the handle placed between the sidewalls and above the bottom portion thereof constructed and adapted so as to prevent a person's hand when engaged with the handle from coming in contact with material for which the scoop is being used. Additionally, the scoop structure of this invention is provided with rounded contours on the outer surfaces thereof in order to prevent material handled by the scoop from clinging to the scoop. The sheath structure of the herein described invention is constructed in an elongated rectangular box-like configuration having an open end to the cavity inside the structure in which the scoop is placeable and having a device to attach the sheath to a supporting structure. The attaching device consists of a male locking member integral with one side of the sheath structure and cooperatively engagable with a female locking member that is attachable to a supporting structure for support of the sheath. The interior of the sheath is the cavity and has smoothly contoured interior walls with rounded or arcuate corners that match the contour of the outside of the scoop. The scoop and sheath structures of this invention are adapted to be mounted on a supporting structure, for example, an ice machine wherein the female locking member can be mounted with the structure and the sheath can be engaged therewith and held in place by its male locking member. The scoop and sheath of this invention are constructed and adapted to have the scoop placed in the sheath for storage when not in use.

One object of this invention is to provide a scoop and sheath means structure overcoming the aforementioned disadvantages of the prior art devices.

Still, one other object of this invention is to provide a scoop and sheath means therefor having the scoop and sheath means constructed and adapted to be mounted with a supporting structure wherein the sheath is removably attachable to the supporting structure and adapted to enclose the scoop for storage in a position which is convenient for removal of the scoop from the sheath when it is desired to be used.

Still another object of this invention is to provide a scoop and sheath means therefor having a sheath structure adapted to be removably mountable with a supporting structure having a cavity therein and further having the cavity smoothly contoured and particularly shaped to the exterior shape of the scoop therefor.

Yet, another object of this invention is to provide a scoop and sheath means therefor having a scoop structure constructed with a material carrying compartment having an open cavity with a handle on the back or rear portion thereof and having another compartment containing the handle and formed by the sidewalls of the open cavity and the bottom extending rearward alongside the handle so as to prevent contact of a person's hand with the material when the hand is engaged with the handle.

Still another object of this invention is to provide a scoop and sheath means thereof having a scoop structure with an elongated material carrying compartment, comprised of a planar bottom portion and planar sidewalls extending from the bottom, an upright portion forming the rear of the material carrying compartment, and a handle compartment extending rearward from the upright portion between the sidewalls and above the bottom with a handle therein attached to the upright portion, and the scoop structure having rounded or arcuate corners and a smooth exterior to prevent material from clinging to the scoop structure and for easy cleaning.

Various other objects, advantages, and features of the invention will become apparent to those skilled in the art from the following discussion, taken in conjunction with the accompanying drawings, in which:

FIG. 1 is a perspective view of the scoop alone taken from above the material compartment end thereof with the obscured interior portions thereof shown in dashed lines for clarity;

FIG. 2 is a side elevation view of the sheath with the scoop structure mostly therein, having the interior of the sheath and the features of the scoop shown in dashed lines for clarity;

FIG. 3 is an end elevation view of the sheath with the scoop therein taken from lines 3—3 in FIG. 2;

FIG. 4 is a perspective view of an ice-making machine with a top-front opening having the sheath secured to one end thereof with the scoop therein;

FIG. 5 is a perspective view of an ice machine having the female coupling block secured thereto with the sheath removed therefrom and adajcent thereto showing the male portion of the coupling;

FIG. 6 is a perspective view of a portion of the sheath structure with the male coupling member and the female coupling block member spaced adjacent thereto;

FIG. 7 is a perspective view taken from above of an ice cart having the sheath mounted on one end thereof with the scoop therin;

FIG. 8 is a perspective view of an ice machine having the refrigerating apparatus extending upward on the top thereof with the sheath mounted on the side of the ice machine structure with the scoop therein; and FIG. 9 is a perspective view, taken from above, of a portion of an ice machine having an interior storage compartment above the ice storage area with the sheath mounted in the interior compartment above the ice storage area and having the scoop therein.

The following is a discussion and description of preferred specific embodiments of the scoop and sheath means of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1 and FIG. 2, the scoop and sheath structure of this invention are shown therein, and generally indicated at 10, with the scoop indicated at 12 and the sheath indicated at 14. The scoop and sheath structure of this invention includes the scoop 12 and the sheath 14 that are adapted to be cooperatively engaged with the scoop 12 inside the cavity of the sheath 14 and the sheath being mountable on the supporting structure. The scoop and sheath structure of this invention is constructed and adapted to have the sheath portion thereof mounted with a supporting structure for storage of the scoop when not in use. Additionally, the structure of this invention includes a scoop constructed and adapted to be engagable in the sheath for storage and having a material carrying compartment at one end portion of the scoop, and a handle compartment at the other end portion of the scoop so as to prevent contact between a person's hand on the handle and the material which is being scooped.

The scoop and sheath structure of this invention is shown, depicted and described herein in conjunction with use of the scoop and sheath for the handling of particulate material and, in particular, ice. The sheath is described and depicted in conjunction with mounting same on ice-making machines. It is to be understood that the scoop and sheath of this invention are not to be restricted specifically to use with ice machines and the handling of ice material. It is to be understood that the scoop and sheath means of this invention are adapted for numerous uses in the handling of particulate material wherein the sheath structure can be mounted on any substantial supporting structure preferably adjacent to the material which is to be worked with, transported, measured, or whatever. In the hereinafter description in conjunction with use of the scoop to handle particulate material, such particulate material includes material in particle form; for example, ice cubes, cracked ice, flour, sugar, small grains, beans, ground beef, salt, candy, sand, etc.

The scoop structure is shown in detail in FIG. 1, FIG. 2, and FIG. 3. The scoop is preferably constructed with all the portions thereof integrally joined into a unitary structure. The scoop 12 includes a bottom portion 20 extending in a single plane and having a rectangular shape, sidewalls 22, an upright member 24 between the sidewalls; and a handle 26 extending from the upright member 24. The scoop has a front or leading edge portion 28 along the forward edge portion of the bottom 20 between the sidewalls 22 and a rear or trailing edge portion 30 on the opposite end of the bottom portion 20 between the sidewalls 22. The bottom portion 20 of the scoop 12 is rectangularly shaped in an elongated fashion with the forward 28 and rear 30 portions thereof being the narrower of the bottom edges and having elongated edge portions 38 and 40 on the other edge portions thereof. The scoop has two compartments, a material carrying compartment 34 on the forward end thereof and a handle compartment 36 on the rear thereof behind the upright member 24. The upright portions 22 are shaped as shown in the drawings having a small elongated pointed forward portion 42 extending over the major length of the sidewall and the shorter pointed portion 44 on the rear of the sidewall tapering to join the trailing edge 30 of the bottom 20. The forward pointed portion 42 of the sidewall is preferably constructed with a rounded upper edge portion 46, and so is the rear pointed portion 44. The upright center portion 24 of the scoop 12 is a generally rectangular shaped member joined by the sidewalls 22 on its side edges and the bottom 20 on its lower edge, and it is preferably positioned at an angle relative to the scoop bottom 20 as shown in FIG. 2. The upright member 24 has a top edge 50 joining the upper edges 46 and 48 at the apex portion of the sidewalls 22. The handle 26 is preferably integrally formed with the upright member 24 and extends therefrom into the handle compartment 36 above the scoop bottom 20 and between the sidewalls 22.

The outer surface of the scoop 12 is preferably constructed to have a smooth contour particularly in the areas where the edges 38 and 40 of the bottom 20 join the sidewalls 22. In these corner areas the edges 38 and 40 are rounded on both the outer and inner portions of the structure, and the leading 28 and trailing 30 edges of the bottom are rounded in an arcuate construction at their intersection with the bottom edges 38 and 40 and with the sidewall edges 46 and 48 to produce a smoothly contoured structure. On the upper portion of the scoop structure 12 the intersection of the upright member 24 with the sidewalls 22 is preferably constructed in a similar rounded and smooth contour as indicated at 52 and as can be seen in the end view of the scoop in FIG. 3. The rounded contours of the scoop structure 12 are adapted to prevent a build-up or collection of material on the scoop as it is used in handling material, to provide for easier cleaning, and to make it somewhat easier for the scoop to slide through some types of material. In the event that the particulate material with which the scoop 12 is being used has some adhesive qualities, it may tend to adhere to the scoop structure; in this instance the rounded and smooth contours of the scoop 12 will tend to prevent a contaminate material build-up on the scoop structure.

The sheath structure 14 is shown in detail in FIGS. 2, 3, 5, and 6. The sheath 14 is basically an elongated rectangular container with a cavity therein adapted to receive the scoop 12, and which is removably mountable with a supporting structure. Referring to FIG. 2 and FIG. 3 in particular, the sheath 14 as shown has a bottom sidewall 60, a top sidewall 62, and side sidewalls 64 and 66 all integrally joined on the edge portions thereof and connected to a bottom 68. The sidewalls 60, 62, 64 and 66 of the sheath are rectangular in shape and joined with each other at the bottom 68 and on their edge portions. The interior of the sheath 14 is constructed with smoothly contoured and arcuate interior edge portions 70 on its elongated edges and also arcuate or rounded construction at the corners 72. The interior of the sheath 14 forms the cavity in which the scoop 12 is placed for storage. The cavity preferably has the rounded corner construction so as to prevent the build-up of contaminate material and for easy cleaning of the edge portions and corner portions of the cavity. FIG. 2 shows the scoop 12 in the sheath 14 with the forward scoop edge 28 spaced back from the sheath bottom 68 and the corner 72. When the scoop 12 is in the normal inserted position in the sheath 14, the forward edge 28 of the scoop would contact the sheath's bottom 68 at the corner 72.

FIG. 5 and FIG. 6 show in detail the sheath mount, which includes a male lock member 80 on the sheath 14 and a female block member 82 adapted to cooperatively engage the male lock member 80. The male part 80 is integrally attached to and extends from the sheath sidewall 60 as shown in FIG. 2 and FIG. 3. The male part 80 is trapezoidal in cross-section and in its plan shape and is elongated and tapered as shown in the combination of FIGS. 3, 5, and 6. The smaller portion of the male part 84 is immediately adjacent the bottom sidewall 60 with the larger portion thereof spaced from the sidewall. The male part has angular edge portions 88 joining the smaller portion 84 and larger portion 86. The male part 80 is tapered with the larger portion thereof at the open end portion of the sheath 14 and the smaller portion thereof toward the closed end portion of the sheath, and the male part is preferably longitudinally aligned with the sheath as shown in FIG. 5. The female part of mounting block 82 has a female recess therein indicated at 90 and holes therethrough indicated at 92 by which the block can be mounted. The female recess 90 is trapezoidally shaped to cooperatively engage with the male part 80 by having an interior with tapered edge portions 94 to engage the sides 88 of the trapezoidally shaped male part 80. To engage the male part 80 and the female part 82, the sheath 14 is positioned adjacent to the mounting block 82 so the male part 80 aligns with the small portion of the male part 80 adjacent to the large portion of the female recess 90 and is moved into the recess to bring the edge portions 88 of the male part 80 into contact with the tapered portions 94 of the mounting block 82. This mounting apparatus is adapted to hold the sheath 14 engaged with the mounting block 82 in an upright position such as shown in FIG. 5, wherein the weight of the sheath is sufficient to hold the male part 80 in engagement with the female part 82. The sheath 14 is removable from the mount 82 by lifting it to disengage the male and female portions of the mount. The removable feature of sheath 14 is to provide for easy cleaning of it. The mounting block 82 is provided with holes 92 by which it can be used to secure it to a supporting structure by screws 96 as indicated in FIG. 5. The holes 92 are preferably tapered on their opening to accommodate flat headed screws. The mounting block 82 may be secured to a supporting structure by other means; for example, adhesive bonding, depending upon the structure to which it is secured. FIG. 5 shows the mounting block 82 secured by screws 96 to the side of an ice machine, indicated at 100, wherein the sheath 14 will be adjacent to the ice storage opening 102 in an upright position with the scoop 12 also upright having the handle 26 readily available through the open end of the sheath 14.

In the use and operation of the scoop and sheath 10 of this invention, the mounting block 82 is mounted with some supporting structure preferably adjacent to wherever the scoop 12 is to be used so the sheath 14 can be secured with the mounting block 82 for convenient use of the scoop in such area. In view of the numerous possible applications for the scoop and sheath 10 of this invention, it is shown in the drawings in conjunction with only one use of the scoop, that is, in conjunction with the handling of ice particles. FIGS. 4, 5, 7, 8, and 9 show the scoop and sheath 10 of this invention mounted with several different ice dispensing devices wherein the sheath 14 is secured to the structure of the dispensing device in a convenient place for the scoop 12 to be removed from the sheath 14 for use. In these several specific applications the mounting block 82 is secured with the machine structure by screws such as shown in FIG. 5 where it is mounted on an ice machine 100.

FIG. 4 shows the scoop and sheath 10 of this invention secured to the side of an ice machine 106. The ice machine 106 is the type with an opening 108 at an angle on the upper portion thereof and is normally covered by a door which slides or lifts to a position exposing the ice material 110 in the storage cavity of the ice machine 106. In this instance the mounting block 82 is secured to the sidewall of the machine 112 so the sheath 14 is in an upright and slightly angular position as shown. In this upright and angular position for the scoop and sheath apparatus 10, the scoop 12 is conveniently removable from the cavity of the sheath 14 for use in removing ice material 110 from the machine, and likewise it is easily replaceable in the sheath for storage.

FIG. 7 shows the scoop and sheath 10 of this invention mounted with a conventional ice cart indicated at 114. The ice cart 114 is an insulated container having wheels and adapted for use in the transportation of ice from an ice-making machine to whereever it is to be used in a convenient manner without substantially melting the ice; it is provided with an opening 116 on its upper portion through which ice is placed into the insulated compartment of the cart. As shown in FIG. 7 the sheath 14 is secured to the sidewall 118 of the ice cart wherein the mounting block 82 can be mounted by means of screws as hereinbefore shown and described. Placement of the scoop and sheath 10 of this invention on an end of the ice cart affords convenient removal of the scoop 12 from the sheath 14 for use in handling and distributing, loading and unloading of the ice material from the ice cart 114.

FIG. 8 shows the scoop and sheath 10 of this invention secured to another type of ice machine indicated at 120. The ice machine 120 is of the type with the refrigeration apparatus for the machine extending substantially above the ice storage compartment. The ice machine 120 is provided with a door 122 covering the opening to the ice storage compartment which is the lower portion of the machine. In this instance the scoop and sheath 10 of this invention are preferably secured to a sidewall 124 of the ice machine 120 in an upright and angular manner as shown, thereby facilitating easy removal of the scoop 12 from the sheath 14 as needed. The scoop and sheath 10 of this invention are particularly advantageous for a machine 120 such as this one which has a door 122 that opens upward and which must be held open while removing ice from the storage compartment. For one person to remove ice from the storage compartment of the ice machine 120, he must hold the door 122 open with one hand while removing ice with the other; in this instance the scoop and sheath can have a particularly unique advantage because of accessibility.

FIG. 9 shows a portion of an ice machine 126 having a large interior storage compartment with a shelf 128 in the storage compartment to allow use of the ice machine 126 as a cooler as well as an ice producing machine. The scoop and sheath 10 of this invention can be secured to the shelf 128 by attaching the mounting block 82 to it. In this instance the scoop 12 and sheath 14 can be positioned at a place on the shelf which is convenient relative to the opening of the ice compartment. With the ice material 130 immediately below the shelf 128, the scoop 12 can be removed from the sheath 14, when the door to the ice compartment is opened, used to remove ice material 130 from the compartment, and again replaced in the sheath. In the machines of this type with an interior compartment that allows the device to be used as a cooler, placing of the scoop and sheath 10 of this invention inside the machine provides some security for the scoop and the sheath as it is not exposed as it would be on the exterior of a device. Additionally, in enclosing the scoop and sheath 10 of this invention within the cavity of the ice machine 126, it is maintained at a cool temperature since it is within the refrigerated compartment; this may in some instances be an advantage, and the possibility of it being placeable inside the refrigerated cavity is available for whatever value there is in it.

In the manufacture of the scoop and sheath structure of this invention, it is obvious that the scoop and the sheath can both be easily produced due to their simple nature of construction in order to achieve the end product. The mounting block 82 and the sheath 14 with the male portion 80 thereon can be molded from plastic material by injection molding or other common manufacturing techniques in order to produce the accurately formed portions thereof in an economical manner. Additionally, the scoop 12 can be molded of a plastic material by injection molding techniques or other commercial manufacture techniques. In the alternative, the scoop 12, sheath 14, and mounting block 82 can be formed of metal material such as stainless steel or aluminum and molded or forged into the shape of the required parts. In any event it is obvious that the scoop and sheath 10 of this invention and with the mounting block 82 are basically simple in configuration and present no major obstacles in construction and manufacture thereof regardless of the material of construction.

In the use and operation of the scoop and sheath structure of this invention, it is seen that same provides a scoop and a storage sheath therefor which are designed so as to prevent contact contamination between a person's hand and material. The sheath of this invention provides a storage container for the scoop and is conveniently mountable with a supporting structure. As shown and described in the drawings, the scoop and sheath structure of this invention 10 is mountable on a supporting structure adjacent to the area in which the particulate material to be handled is stored. An important feature of the scoop 12 is that it has a handle compartment 36 to shield the hand of a person using the scoop, thus preventing contact between the material scooped and the user's hand. The scoop is designed to effectively prevent the buildup of material on it due to its rounded and shaped contours. Likewise, the sheath is constructed and adapted to prevent the build-up of contaminate-like particulate material within its cavity due to the rounded and smoothed interior cavity features. Additionally, the sheath structure is adapted to be easily mountable with a supporting structure by means of the mounting block and its female recess cooperatively locking with a male-like part of the sheath structure. The sheath structure is adapted to be mountable in an upright position on a supporting structure preferably adjacent to the area in which the particulate material to be transferred is located.

As will become apparent from the foregoing description of the applicant's scoop and sheath structure, relatively simple and inexpensive means have been produced to provide a scoop and a storage sheath therefor which are mountable with a supporting structure, the scoop being adapted specifically for the handling of particulate material and the sheath adapted for use in storing the scoop when not in use. The sheath structure includes the sheath and a mounting block to mount the structure with an additional supporting structure such as a wall, a machine, a display countertop or counterwall, etc. The scoop is obviously simple to use and provides means whereby the hand of the person using the scoop is shielded from the material which is being scooped thereby preventing contamination of the material from hand contact. Additionally, the scoop is easily usable over and over and storable in the sheath when not in use. Furthermore, the scoop and sheath structure of this invention is constructed so as to prevent a contaminate material buildup on either the scoop or the sheath.

While the invention has been described in conjunction with preferred specific embodiments thereof, it will be understood that this description is intended to illustrate and not limit the scope of the invention, which is defined by the following claims.

We claim:

1. A combination elongated scoop and sheath for handling particulate material, said scoop comprising a bottom portion having a pair of side edges and a pair of end edges, a pair of upright sides connected to said side edges, each of said sides generally taper upwardly from said end edges to define an apex, a partition member attached to said bottom portion and to said sides in proximity to said apex, a handle secured to said partition member and enclosed by said sides, and said sheath comprising a plurality of attached sidewalls and an end member attached to said sidewalls forming a cavity wherein said scoop is stored, said sheath additionally includes means to mount said sheath on a surface of a supporting structure, said means to mount comprising a first coupling means attached to one of said sidewalls and a second coupling means secured to said supporting structure and cooperating with said first coupling means to mount said sheath on said supporting structure.

2. The combination of claim 1 wherein said first coupling means comprises a male coupling and said second coupling means comprises a female coupling including a female recess to receive said male coupling.

3. The combination of claim 1 wherein said bottom portion, said pair of sides, said partition member, and said handle are integrally formed of a plastic material.

4. The combination of claim 2 wherein said male coupling is integrally attached to one of said sidewalls of said sheath and includes a trapezoidal shaped outer surface, and said female recess is trapezoidal in shape for removably lodging said male coupling.

5. The combination of claim 2 wherein said sidewalls, said end member, and said means to mount are integrally formed of plastic material.

* * * * *